Jan. 8, 1924.

L. A. COLLIS 1,480,509

HYDRAULIC LIFTING TRUCK

Filed Aug. 3, 1921

Inventor
Leslie Alfred Collis
By
Charles L. Norris
Attorney

Jan. 8, 1924.

L. A. COLLIS 1,480,509

HYDRAULIC LIFTING TRUCK

Filed Aug. 3, 1921

Inventor
Leslie Alfred Collis
By
Attorney

Patented Jan. 8, 1924.

1,480,509

UNITED STATES PATENT OFFICE.

LESLIE ALFRED COLLIS, OF PUTNEY, LONDON, ENGLAND.

HYDRAULIC LIFTING TRUCK.

Application filed August 3, 1921. Serial No. 489,452.

*To all whom it may concern:*

Be it known that LESLIE ALFRED COLLIS, a subject of the King of Great Britain, residing at Putney, London, England, has invented certain new and useful Improvements in Hydraulic Lifting Trucks, of which the following is a specification.

This invention relates to that class of lifting truck, in which the lifting platform is raised by hydraulic means and the object of this invention is to so construct the forward portion of the carriage that the handle usually carried by the truck can be employed as a means for operating the pump plunger or mechanical lifting mechanism (the handle being in any position) for pushing or pulling the truck and can also be employed for steering the truck whether pushing or pulling, the pump plunger or rod or equivalent actuating the lifting mechanism being positioned axially with the steering stem of the steering wheels.

My invention will be clearly understood from the following description aided by the annexed drawings in which I show my invention as connected with a hydraulic lifting truck.

For the purpose of my invention I construct the king bolt or stem A carrying the front wheels B with the pump plunger cylinder C open at the bottom and connected at the top with the usual valve mechanism D and the ram cylinder E and surrounding this king bolt A I position a sleeve F carrying a projecting lug G and two depending arms H, H having bearings carrying the axle or shaft I to which the two front wheels B, B are connected the bearings of the arms H, H with the axle I projecting in front or outside of the vertical axial line of the pump plunger cylinder C.

The handle J is preferably carried by a socket piece K the lower end L of which is bent and is provided with a bearing M encircling the axle or shaft I between the two front wheels B, B and such socket K is also provided with an extension L to which is connected the pump plunger N by a link $N^1$ the plunger N being positioned within the cylinder C in the king bolt, a joint being made by the gland P.

The socket K is provided with a lug Q which cooperates with the lug on the king bolt and which is shaped to embrace spring clips R, R positioned on the lug G on the sleeve F when the handle J is vertical to hold the handle J in that position when not in use as shown.

The sleeve F is held on the king bolt A by a ring S screwed to the king bolt A or by other means.

To reciprocate the pump plunger N the handle J is freed from the springs R, R of the lug G on the sleeve F and reciprocated on its bearings and the pump plunger N being central of the king bolt A and the handle J and front wheels B, B moving round same the truck T can be steered by the handle J which is free and also pulled and pushed about and steered at the same time, whilst when the handle J is held in vertical position the truck T can be pushed and steered by the handle J the lug Q on the handle or its socket K finding a bearing against the lug G on the king bolt.

Figure 1:
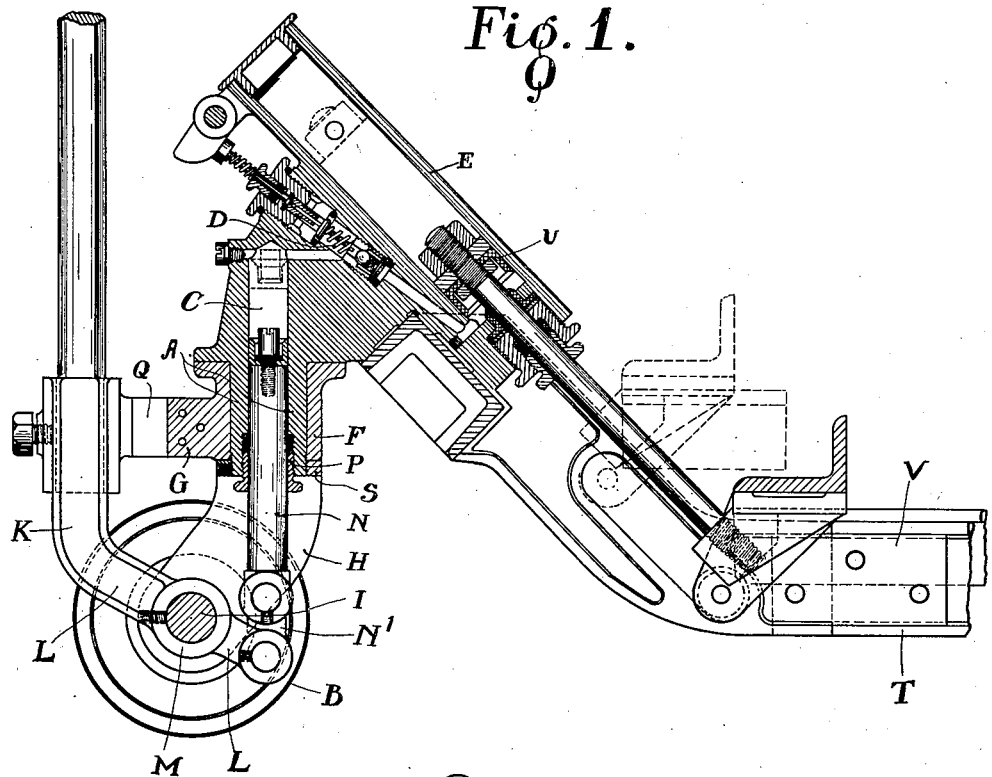
Figure 1 is a longitudinal section of the steering end of a hydraulic lifting truck showing one form of my invention.
Figure 3:
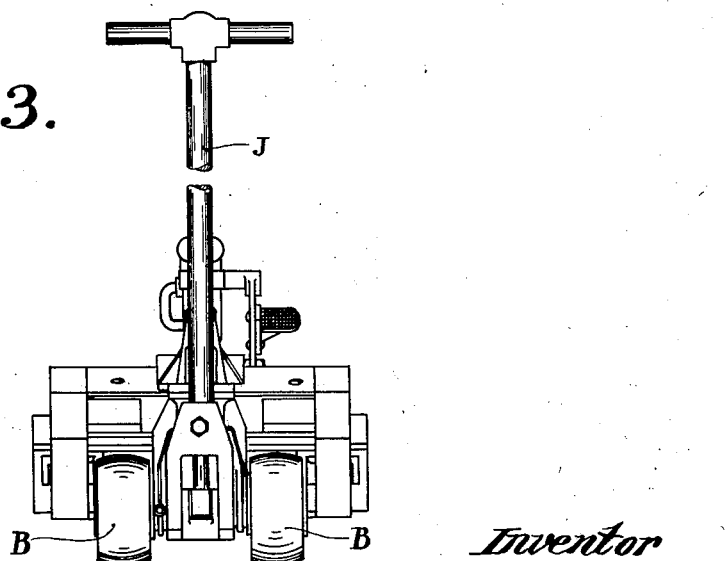
Figure 3 a front elevation and Figure 4 a side elevation of a hydraulic lifting truck with my invention applied.
Figure 2:
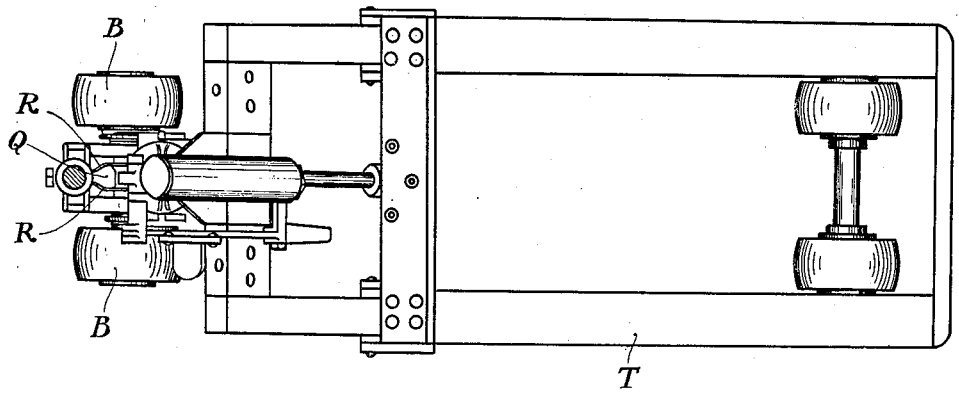
Figure 2 is a plan.
Figure 2:
Figure 4:
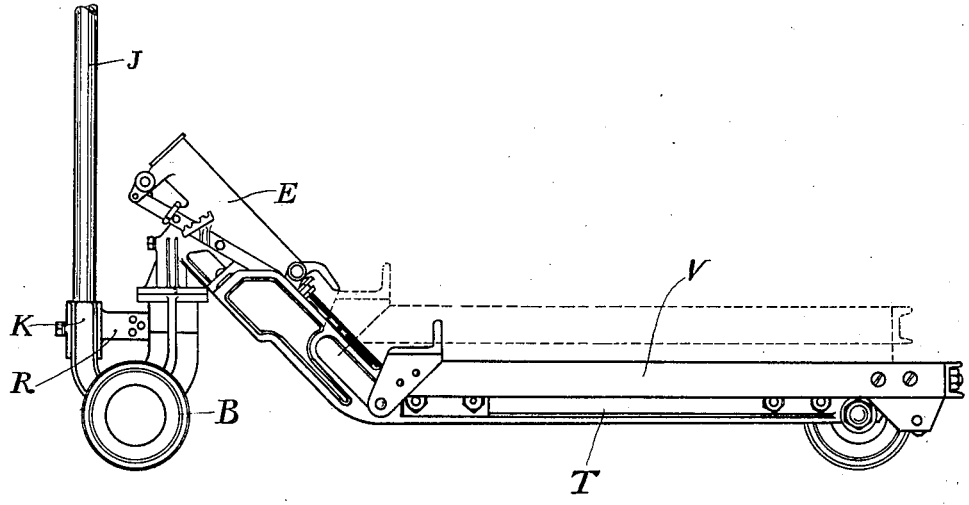

In other respects the hydraulic apparatus may be constructed as is shown at Figure 1 or otherwise so that the ram U in the cylinder E raises the lifting platform V.

What I do claim as my invention and desire to secure by Letters Patent is:

1. In a truck, a forward body portion having a king bolt thereon, a lifting platform connected to and movable relative to said forward body portion, a cylinder connected to the forward body portion, a piston slidable in said cylinder connected to the platform and a pump piston and cylinder concentric with the king bolt, said pump cylinder being in communication with said first named cylinder.

2. A hydraulic truck or jack having a forward body portion and king bolt, a lifting platform, a ram and cylinder connecting said body portion and platform, a pump concentric with said king bolt, and means for both operating said pump and for steering said truck.

In testimony whereof I have hereunto set my hand in presence of two subscribing witnesses.

LESLIE ALFRED COLLIS.

Witnesses:
RICHARD CORE GARDNER,
LYNWOOD A. GARDNER.